(12) United States Patent
Tourapis et al.

(10) Patent No.: US 9,877,046 B2
(45) Date of Patent: Jan. 23, 2018

(54) CODING AND DECODING OF INTERLEAVED IMAGE DATA

(71) Applicant: Dolby Laboratories Licensing Corporation, San Francisco, CA (US)

(72) Inventors: Alexandros Tourapis, Milpitas, CA (US); Walter J. Husak, Simi Valley, CA (US); Peshala V. Pahalawatta, Glendale, CA (US); Athanasios Leontaris, Burbank, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 307 days.

(21) Appl. No.: 14/613,651

(22) Filed: Feb. 4, 2015

(65) Prior Publication Data

US 2015/0181234 A1 Jun. 25, 2015

Related U.S. Application Data

(63) Continuation of application No. 13/146,641, filed as application No. PCT/US2010/022445 on Jan. 28, 2010, now Pat. No. 9,025,670.

(Continued)

(51) Int. Cl.
*H04N 19/597* (2014.01)
*H04N 13/00* (2006.01)
(Continued)

(52) U.S. Cl.
CPC ....... *H04N 19/597* (2014.11); *H04N 13/0048* (2013.01); *H04N 13/0059* (2013.01);
(Continued)

(58) Field of Classification Search
CPC ............. H04N 13/0048; H04N 19/587; H04N 19/597; H04N 19/85; H04N 13/0059;
(Continued)

(56) References Cited

U.S. PATENT DOCUMENTS 4,985,767 A 1/1991 Haghiri
5,543,845 A * 8/1996 Asamura ................ H04N 19/61
375/240.01

(Continued)

FOREIGN PATENT DOCUMENTS

CN 1367611 9/2002
CN 1492687 4/2004

(Continued)

OTHER PUBLICATIONS

Notice of Allowance issued in U.S Appl. No. 13/146,641 dated Mar. 20, 2015, 10 pages.

(Continued)

*Primary Examiner* — Md Haque

(57) ABSTRACT

Sampled data is packaged in checkerboard format for encoding and decoding. The sampled data may be quincunx sampled multi-image video data (e.g., 3D video or a multi-program stream), and the data may also be divided into sub-images of each image which are then multiplexed, or interleaved, in frames of a video stream to be encoded and then decoded using a standardized video encoder. A system for viewing may utilize a standard video decoder and a formatting device that de-interleaves the decoded sub-images of each frame reformats the images for a display device. A 3D video may be encoded using a most advantageous interleaving format such that a preferred quality and compression ratio is reached. In one embodiment, the invention includes a display device that accepts data in multiple formats.

17 Claims, 12 Drawing Sheets

Related U.S. Application Data

(60) Provisional application No. 61/148,051, filed on Jan. 29, 2009.

(51) Int. Cl.

| H04N 19/176 | (2014.01) |
|---|---|
| H04N 19/33 | (2014.01) |
| H04N 21/2365 | (2011.01) |
| H04N 21/2383 | (2011.01) |
| H04N 21/434 | (2011.01) |
| H04N 21/438 | (2011.01) |
| H04N 19/46 | (2014.01) |
| H04N 19/61 | (2014.01) |
| H04N 19/60 | (2014.01) |
| H04N 19/112 | (2014.01) |
| H04N 19/16 | (2014.01) |
| H04N 19/587 | (2014.01) |
| H04N 19/85 | (2014.01) |

(52) U.S. Cl.
CPC .......... *H04N 19/112* (2014.11); *H04N 19/16* (2014.11); *H04N 19/176* (2014.11); *H04N 19/33* (2014.11); *H04N 19/46* (2014.11); *H04N 19/587* (2014.11); *H04N 19/60* (2014.11); *H04N 19/61* (2014.11); *H04N 19/85* (2014.11); *H04N 21/2365* (2013.01); *H04N 21/2383* (2013.01); *H04N 21/4347* (2013.01); *H04N 21/4382* (2013.01)

(58) Field of Classification Search
CPC .... H04N 19/112; H04N 19/16; H04N 19/176; H04N 19/33; H04N 19/46; H04N 19/60; H04N 19/61; H04N 21/2365; H04N 21/2383; H04N 21/4347; H04N 21/4382
See application file for complete search history.

(56) References Cited

U.S. PATENT DOCUMENTS

| 5,650,860 | A | 7/1997 | Metin |
|---|---|---|---|
| 5,915,067 | A | 6/1999 | Nonomura |
| 6,118,486 | A | 9/2000 | Reitmeier |
| 6,134,269 | A | 10/2000 | Puri et al. |
| 6,144,701 | A | 11/2000 | Tihao |
| 6,661,463 | B1 | 12/2003 | Geshwind |
| 6,804,403 | B1 | 10/2004 | Wang et al. |
| 7,733,819 | B2 | 6/2010 | Lee |
| 8,373,744 | B2 | 2/2013 | Akka et al. |
| 8,487,982 | B2 | 7/2013 | Lipton et al. |
| 8,879,857 | B2 | 11/2014 | Raveendran et al. |
| 9,025,670 | B2 | 5/2015 | Tourapis et al. |
| 2001/0022887 | A1 | 9/2001 | Lee |
| 2002/0122510 | A1 | 9/2002 | Yamaguchi et al. |
| 2003/0156188 | A1 | 8/2003 | Albie |
| 2003/0199079 | A1 | 10/2003 | Penin |
| 2003/0223499 | A1 | 12/2003 | Routhier et al. |
| 2004/0008893 | A1 | 1/2004 | Itoi et al. |
| 2004/0218269 | A1 | 11/2004 | Divelbiss |
| 2004/0223655 | A1 | 11/2004 | Liao et al. |
| 2005/0018771 | A1 | 1/2005 | Bourge et al. |
| 2005/0084006 | A1 | 4/2005 | Lei et al. |
| 2005/0117637 | A1 | 6/2005 | Routhier et al. |
| 2005/0123207 | A1* | 6/2005 | Marpe .................. H04N 19/196 382/239 |
| 2006/0029136 | A1 | 2/2006 | Cieplinski |
| 2006/0282855 | A1 | 12/2006 | Margulis |
| 2007/0147514 | A1 | 6/2007 | Yamaguchi et al. |
| 2008/0089405 | A1 | 4/2008 | Cho et al. |
| 2008/0225113 | A1* | 9/2008 | Saishu ............... H04N 13/0415 348/51 |
| 2009/0103632 | A1 | 4/2009 | Choi et al. |
| 2009/0128620 | A1 | 5/2009 | Lipton |
| 2009/0322940 | A1* | 12/2009 | Kempf .................. H04N 7/012 348/448 |
| 2010/0053305 | A1 | 3/2010 | Guillou |
| 2011/0170792 | A1 | 7/2011 | Tourapis |
| 2011/0280300 | A1 | 11/2011 | Tourapis et al. |
| 2012/0300843 | A1 | 11/2012 | Horlander |
| 2015/0237373 | A1 | 8/2015 | Tourapis et al. |
| 2015/0326882 | A1 | 11/2015 | Tourapis et al. |

FOREIGN PATENT DOCUMENTS

| CN | 1647546 | 7/2005 |
|---|---|---|
| CN | 101015219 | 8/2007 |
| CN | 201066898 | 5/2008 |
| CN | 101252686 | 8/2008 |
| CN | 101290774 | 10/2008 |
| DE | 19619598 | 11/1997 |
| EP | 0306448 | 3/1999 |
| JP | H04-13186 | 6/1992 |
| JP | H06-02290 | 1/1994 |
| JP | H06-086260 | 3/1994 |
| JP | 11018111 | 1/1999 |
| JP | 2004336104 | 11/2004 |
| WO | 2003/056843 | 7/2003 |
| WO | 2006/137000 | 12/2006 |
| WO | 2008/127676 | 10/2008 |
| WO | 2010/011577 | 1/2010 |
| WO | 2010/088420 | 8/2010 |

OTHER PUBLICATIONS

Office Action issued in U.S. Appl. No. 14/790,307 dated Oct. 2, 2015, 18 pages.

Anonymous, "Joint Draft 2.0 of Amendment to ITU-T Rec. H.264: Constrained Baseline Profile and Supplemental Enhancement Information" 30th JVT Meeting Jan. 29, 2009 through Feb. 2, 2009.

Hur, et al., "3D HDTV Relay Broadcast Experiments Using a Terrestrial and Satellite Network in Korea" pp. 1221-1224.

Hutchison, David, "Introducing OLP 3-D TV" pp. 1-5, Aug. 25, 2007.

Hutchison, et al., "The Design and Implementation of a Stereoscopic Microdisplay Television" IEEE Transactions on Consumer Electronics, IEEE Service Center, New York, NY US, vol. 54, No. 2, May 1, 2008, pp. 254-261.

ITU-T Telecommunication Standardization Sector of ITU, "Advanced Video Coding for Generic Audiovisual Services" H.264, May 2003.

McCormick, et al., "Implementation of Stereoscopic and Dualview Images on a Micro Display High Definition Television" 3-DTV-Con 2008, Istanbul, Turkey, May 208, pp. 33-36.

SMPTE 421 M-2006 "VC-1 Compressed Video Bitstream Format and Decoding Process" Apr. 2006.

Suhring, JVT reference software version JM14.2, 2010.

Sullivan, et al.,"Meeting Report of the 29th JVT Meeting" Joint Video Team of ISO/IEC JTC1/SC29/WG11 and ITU-T, Oct. 13-17, 2008 in Busan, Korea.

Tagliasacchi, et al., "Symmetric Distributed Coding of Stereo Video Sequences" Image Processing 2007, IEEE International Conference on IEEE, Sep. 1, 2007, pp. 11-29.

Tamhankar, et al., "An Overview of H.264/MPEG-4 part 10" Video/Image Processing and Multimedia Communications, 2003. 4th Eurasian P Conferenced Focused on Jul. 2-5, 2003, Piscataway, NJ, vol. 1, pp. 1-51.

Tourapis, et al., "Format Extensions to the Spatially Interleaved Pictures SEI Message" JVT of ISO/IEC MPEG & ITU-T VCEG, 3oth meeting, Geneva, CH, Jan. 29-Feb. 3, 2009.

Tourapis, et al., "SEI Message for Checkerboard Multiplexed Video Data" Joint Video Team of ISO, 29th Meeting, Busan, KR, Oct. 12-17, 2008.

Tseng, et al., "Compatible Video Coding of Stereoscopic Sequences Using MPEG-2's Scalibility and Interlaced Structure" Signal Processing of HDTV, VI Proceedings of the International Workshop on HDTV 1994 Turin Italy, Oct. 26-28, Amsterdam; Elsevier, NL, Oct. 26, 1994, pp. 1-10.

(56) References Cited

OTHER PUBLICATIONS

Vetro, Anthony, "MVC Profile/Level Definitions of Stereo" JVT Meeting of ISO/IEC MPEG & ITU-T VCEG, 28th meeting Jul. 20-25, 2008.

International Search Report and Written Opinion of the International Search Authority issued in PCT/US2010/022445 dated May 10, 2010, 12 pages.

International Preliminary Report on Patentability issued in PCT/US2010/022454 dated May 24, 2011, 14 pages.

Office Action issued in U.S. Appl. No. 13/146,641 dated Aug. 2, 2013.

Office Action issued in U.S. Appl. No. 13/146,641 dated Jan. 1, 2014.

Office Action issued in U.S. Appl. No. 13/146,641 dated Nov. 13, 2014.

Office Action issued in U.S. Appl. No. 14/790,307 dated Jan. 8, 2016, 10 pages.

\* cited by examiner

CODING AND DECODING OF INTERLEAVED IMAGE DATA

CROSS-REFERENCE TO RELATED APPLICATIONS

This application is a continuation of U.S. application Ser. No. 13/146,641, filed Jul. 27, 2011, which is a 371 U.S. National Phase of International Application No. PCT/US2010/022445, filed Jan. 28, 2010, which claims the benefit of U.S. Provisional Patent Application No. 61/148,051 filed Jan. 29, 2009, hereby incorporated by reference in its entirety.

FIELD OF INVENTION

The present invention relates to coding and decoding of digital data, and particularly to digital video data.

DESCRIPTION OF RELATED ART

In recent years, content providers have become considerably interested in the delivery of stereoscopic (3D) content into the home. This interest is driven by the increased popularity and production of 3D material, but also the emergence of several stereoscopic devices that are already available to the consumer. Several systems have been proposed on the delivery of stereoscopic material to the home.

SUMMARY OF THE INVENTION

The present inventors have realized the need for better encoding and decoding for 3D and other multi-image video systems. In various embodiments, the present invention provides methods, systems, and architectures for the encoding and decoding of video data. For example, encoding and decoding using checkerboard (CB) interleaved video data where data is either "red" or "black" in a format where "red" data follows "black" data preceding "red" data, etc (the "red" data connoting image data of a first image, view, or scene, (collectively referred to as "views" plural or "a view" singular) and "black" data connoting image data of a second independent view (e.g., of a separate video stream) or a related view (e.g., a second view of a 3D image to be rendered from both "red" and "black" data, or another angle of the same view carried in the "red" data). Extending these concepts, an interleaved video may include any one or more of, for example, multiple images from multiple program streams, multiple angles of a same scene, or multiple sets of 3D views of a same or different scene, video game, or program, for example. In addition, preparation of frames for encoding may include sampling performed via quincunx or other sampling techniques. The sampled data is then arranged in an advantageous format (e.g., a format that considers the data or capabilities/tendencies of the encoder) which can be a straight checkerboard or groupings of data (e.g., sub-images) interleaved in one or more patterns. Encoding may then be performed, for example, via MPEG-4 AVC or another encoding technique.

In one embodiment, the present invention provides a method, comprising the steps of sub-sampling n images, separating each of the sampled images into sub-images, packaging the sub-images together into an image frame, and encoding the single image frame via a video encoder. The step of sub-sampling comprises, for example, quincunx sampling. The images may comprise, for example, at least one of left and right views of a 3D image, multiple views of a same scene, and multiple images (and the images may also comprise one of depth and occlusion information), or the images may comprise a group of more than one pixel from one of the images. The sub-images may comprise data within an image having characteristics similar to a normal image, or the sub-images may comprise data selected via a pattern from a corresponding image.

The step of separating may comprise, for example, separating the sampled images based on at least one of rows and columns. The step of separating may comprise preparing multiple blocks of nearby data from each of the sampled images. The step of packaging may comprise interleaving the sub-images in a predetermined format. The predetermined format may be changed adaptively based on, for example, any of the images, the sampled images, and the separated image samples. The method may further comprise a step of encoding a map identifying the pre-determined format. The map may be encoded, for example, in an area of the image frame and the packaging of sub-images is performed in other areas of the image frame. The map may be encoded as side information and/or made part of an image frame. The interleaving may comprise, for example, one of a horizontal interleaving, a vertical interleaving, and a rectangular block interleaving.

The step of sub-sampling may comprise quincunx sampling, the step of separating may comprise preparing sub-images using one of every other row and every other column of a sub-sampled image, and the step of packaging may comprise arranging one of row and column based sub-images. The method may further comprise the step of encoding an identifier of an arrangement of sub-images within the image frame. In one embodiment, the identifier is a code that may be placed in side information of the encoded patterned block. The may also or alternatively be placed in the image frame.

The step of packaging may comprise packaging according to any of the patterns described herein or others. The packaging may maintain, for example, at least one dimension equivalent to a dimension of one of the sub-sampled images. The packaging may comprise, for example, a packaging format selected for efficient use of resources to be utilized to decode the encoded image. The packaging may comprise a packaging format selected for enabling advanced scalability features including SNR/resolution scalability, and 2D to 3D scalability. The packaging format may be selected based on available resources, such as processing capabilities. The packaging may comprise, for example, maintaining pixels of high value for decoding/up-sampling each [sub-image] in close proximity to each other. The step of encoding may comprise, for example, any one image or video encoding system such as JPEG, JPEG-2000, like MPEG-2, MPEG-4 AVC, and VC1 encoding.

In other embodiments, the invention may be embodied as a video device, comprising a decoder configured to decode an encoded video signal comprising more than one image per frame in the video signal, and a format converter comprising a format converter configured to de-interleave groups of video data interleaved in a frame format in the decoded video signal wherein the groups of video data comprise one or more groups of video data from a first image and one or more groups of video data from a second image. The format converter may comprise, for example, a de-interleaver configured to de-interleave the groups of data from multiple interleaving formats. The format converter may comprise, for example, a format reader configured to determine an interleaving format of the groups of data. The format converter may comprise a selection device configured to select one of an algorithm and specialized electronics to perform the de-interleaving based on a format of the interleaved data groups. The format converter may be configured, for example, to de-interleave at least one of horizontal, vertical, block-based, and map-based interleaved groups of video data.

The invention may further comprise an up-converter configured to up convert the de-interleaved groups of data from at least one of the images. The up-converted data may be output, for example, as a 2D image. The 2D image may be formatted, for example, in an HDMI compatible signal. The up-converted data may comprise data of the first image which comprises a first view in a 3D image and data of the second image which comprises a second view of the 3D image.

The video device may be part of, for example, at least one of a Blue-Ray DVD player, a media player, a set-top box, a cable box, a computer video card, a tuner, or other electronic device. The decoder may comprise one of an MPEG-2, MPEG-4 AVC, VC1, and other decoders.

In another embodiment, the invention may be embodied as an encoding system, comprising, a sub-sampler configured to sub-sample images of at least two different views, a formatter configured to select at least one group of image data from each view and interleave the groups into a single image frame of a video stream, and an encoder configured to encode the video stream. The encoder may comprise, for example, an MPEG-4 AVC encoder. The groups of image data comprise, for example, groups of more than one pixel. The formatter may comprise, for example, an even-odd row-column selector and the interleaving groups of image data comprise groups comprising at least one of a horizontal re-arrangement, a vertical re-arrangement, an interleaved horizontal re-arrangement, an interleaved vertical re-arrangement, a block re-arrangement, an interleaved block re-arrangement, vertical interleaved re-arrangement, and a horizontal interleaved re-arrangement.

The encoder may further comprise a selection device configured to select an arrangement for interleaving the groups of data. The encoder may further comprise a mapper configured to map an arrangement of data from the two images as formatted.

The invention may also be embodied as a media storage having a video stream stored thereon, wherein the video stream comprises interleaved sets of data from at least two views, that, when loaded and read by a corresponding media player, cause the player to decode and then de-interleave the video stream and then format the video stream for a display device. The sets of data may comprise, for example, multiple sets of data corresponding to a first view of a 3D image and multiple sets of data corresponding to a second view of the 3D image. The media storage may comprise at least one of a memory card, a disk, and physical properties of an electromagnetic carrier. Storage contents of the media storage may be represented by physical characteristics of at least one of a memory card, an electromagnetic carrier, and an optical disk comprise the video stream and are encrypted.

The invention may yet also be embodied as a video encoding system, comprising, a formatter configured to format at least one package of data corresponding to a first image, at least one package of data corresponding to a second image, at least one of a resolution and dynamic range enhancement of the first image, and at least one of a resolution and dynamic range enhancement of the second image into an image data frame of a video stream, and an encoder configured to encode the formatted first image data and enhancements, second image and enhancements into a video stream for at least one of storage and broadcast. The encoder may constrain sub-images from performing prediction from samples that correspond to other sub-images. The encoder may constrain sub-images packaged earlier in space from performing prediction from samples that correspond to other sub-images.

The invention may yet further be embodied as a video decoding system, comprising, a decoder configured to decode a data frame of a video stream, wherein the data frame comprises image data from at least two images and enhancements for at least one of the images, and a re-formatter configured to re-format the decoded image data from at least one of the images to produce a low resolution version of an original image embodied by the decoded image data. The re-formatter may comprise, for example, a de-interleaver configured to de-interleave data corresponding to the at least one image. The re-formatter may be further configured to discard at least one of the second image data and the enhancements for at least one of the images. The video decoding system may further comprise an enhancer configured to utilize at least some of the decoded enhancements to enhance the decoded image and produce at least one of a higher resolution and higher dynamic range image. The enhancements may be applied to each image progressively and to an extent the video decoding system is capable of doing so in real-time. The enhancements may be applied to each image progressively if the video decoding system is capable of doing so in real-time and an output display device is capable of displaying the enhanced images.

Portions of both the device and method may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In one embodiment, the invention extends the MPEG-4 AVC standard to more appropriately consider the characteristics of the encoded signal, allowing improved coding efficiency and performance. The invention may be implemented, for example, not only at the encoder but also at the decoder. Similar extensions may be made to other encoding/decoding standards, methods, devices, and/or systems. Applications include, for example, Blu-ray video disks and may also include broadcast and download solutions which are more bandwidth constraints (among others). The invention may also be used in a scalable solution that could improve or enhance the current Dolby consumer level 3D video coding system (or other 3D and/or multi-view systems) to full resolution.

The invention in various embodiments is primarily intended for use in Dolby (or other) Stereoscopic (3D) format video encoders & decoders, but may be used in other Dolby and/or non-Dolby specific equipment and/or other types of video (e.g., multi-program, multi-view, multi 3D views, either alone or in combination with others). Applications include, for example, Blu-ray discs, memory cards, broadcast, satellite, and IPTV systems, etc.

Figure 1:
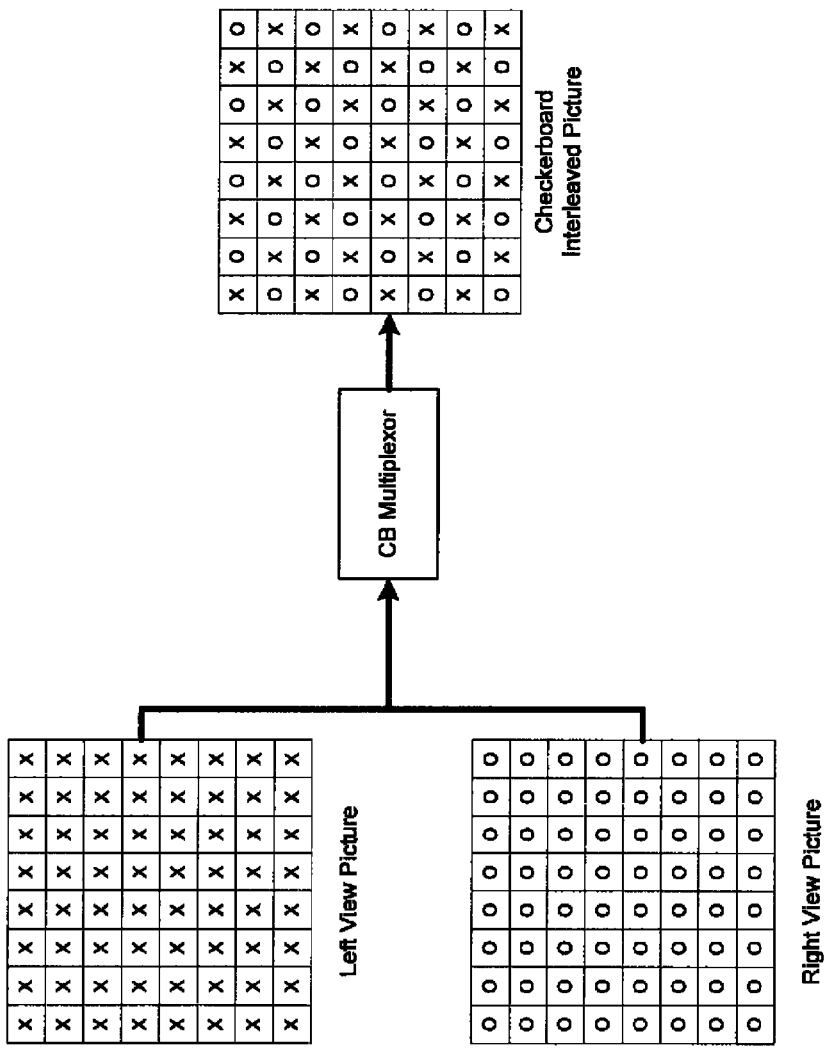
FIG. 1 is a diagram illustrating a checkerboard (CB) multiplexing format according to an embodiment of the present invention.

The present inventors have realized that to ensure rapid adoption of 3D and other technologies among consumers, a solution should be one that can be implemented with minimal or no alteration to existing playback devices such as set-top boxes, DVD, and Blu-ray disk players, as well as existing 3D capable displays. However, converter boxes, hardware/firmware/software modifications, devices and/or displays specifically adapted or designed to new or multiple formats are also consistent with the present invention. One possible solution for the delivery of 3D content without alteration of playback devices is the creating, coding, and delivering video content information by multiplexing the two views using a checkerboard arrangement (see FIG. 1). Such a system may be implemented using the MPEG-4 AVC/H.264 video coding standard or other standards (e.g., Microsoft's VC1). However, the standardized codecs do not consider the nature of the 3D encoded video signal, resulting in suboptimal coding performance.

In particular, these codecs have been designed and contain tools with progressive or row interleaved (interlaced) video content in mind (e.g., only progressive or row interlaced video content). These include tools such as motion estimation, motion compensation, transform, and quantization. However, checkerboard interleaved data can have very different characteristics from progressive or interlaced content. In various embodiments of the invention, these tools are extended to properly account for the characteristics of the data and/or the arrangement in which the data is placed, and therefore improve the coding efficiency, of the content (e.g., content in checkerboard format).

Figure 2:
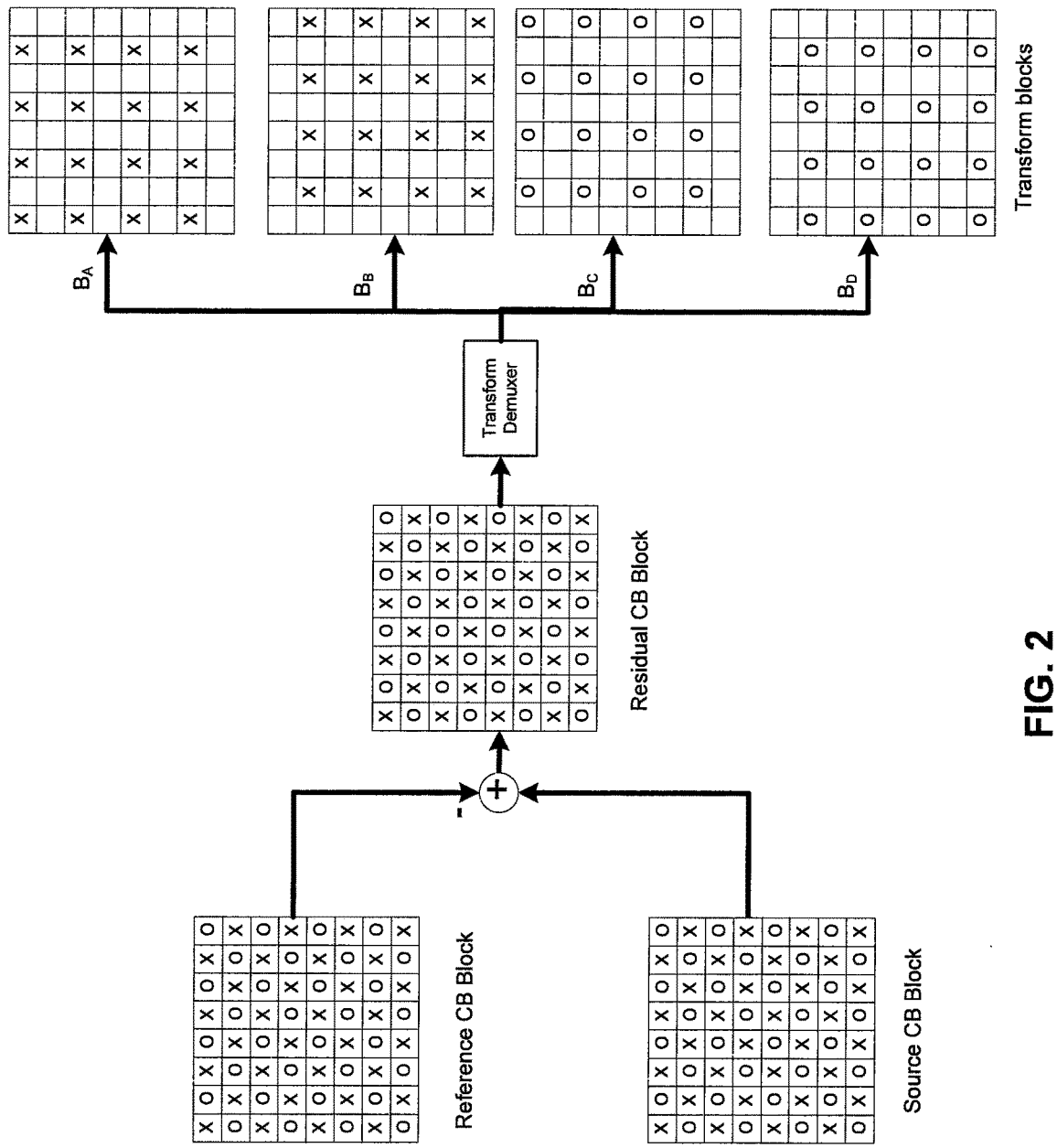
FIG. 2 is a diagram illustrating transform based de-multiplexing of CB data in a frame mode according to an embodiment of the present invention.
Figure 3:
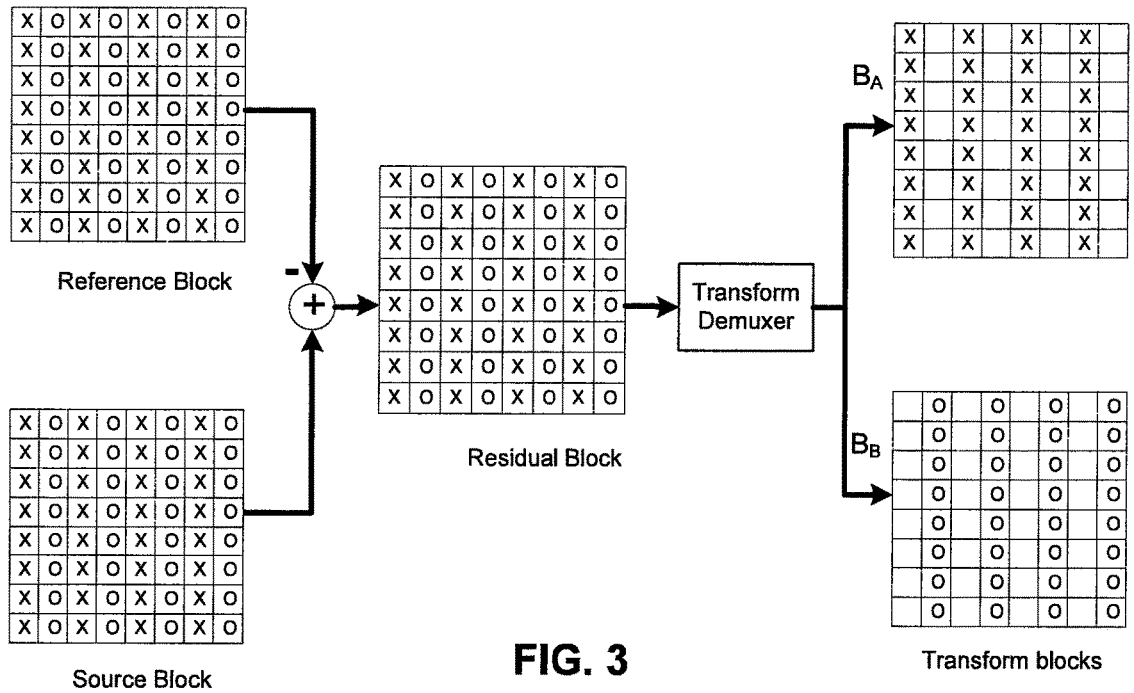
FIG. 3 is a diagram illustrating transform based de-multiplexing of CB data in a field mode according to an embodiment of the present invention.
Figure 4:
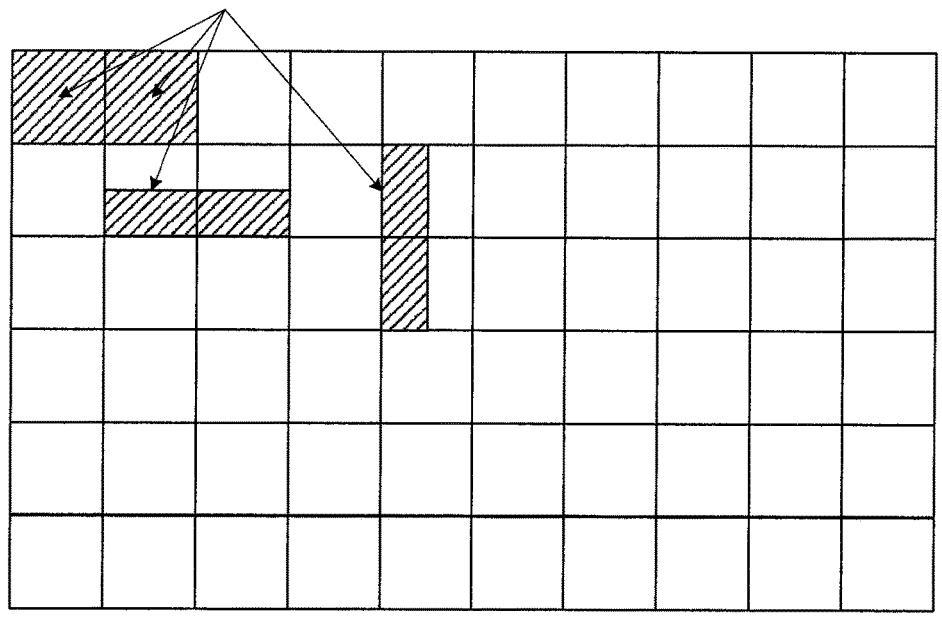
FIG. 4 is a diagram illustrating block motion compensation without overlapping considerations according to an embodiment of the present invention.

In one embodiment, video coding efficiency of checkerboard interleaved content can be achieved by only modifying the transform and quantization process to be applied on checkerboard de-multiplexed data. In particular, as can be seen also from FIG. 2, in this scenario motion estimation and compensation are performed using traditional block based methods that do not account for overlapping blocks (FIG. 4). This process can be justified by the argument that, in general, the checkerboard multiplexed data are characterized by similar motion.

However, after motion compensation or intra prediction is performed, the residual data are checkerboard de-multiplexed before transform and quantization. Given the fact that common transform methods employed in existing codecs are square or orthogonal, de-multiplexing in this scenario does not happen only in terms of different views but also in terms of rows. This would result in 4 blocks that would have to be transformed, e.g., using the 4×4 or 8×8 Integer DCT or other transform, quantized, zig-zag scanned and encoded. In another embodiment, for interlace (i.e. field) pictures, only vertical de-multiplexing may need to be performed since the data are already in the appropriate arrangement for operating such operations. This process could be signaled at the sequence, picture, slice, macroblock, or block level. The scanning order of the quantized coefficients can be also appropriately designed to account for the frequency differences in the horizontal and vertical axis. In particular, for field content the scanning order of the transformed coefficients is commonly vertically biased given the difference between horizontal and vertical frequencies. Given, however, the new coding arrangement we introduce, no such modification is necessary and the normal (i.e. zig-zag) scanning order can still be used.

Figure 5:
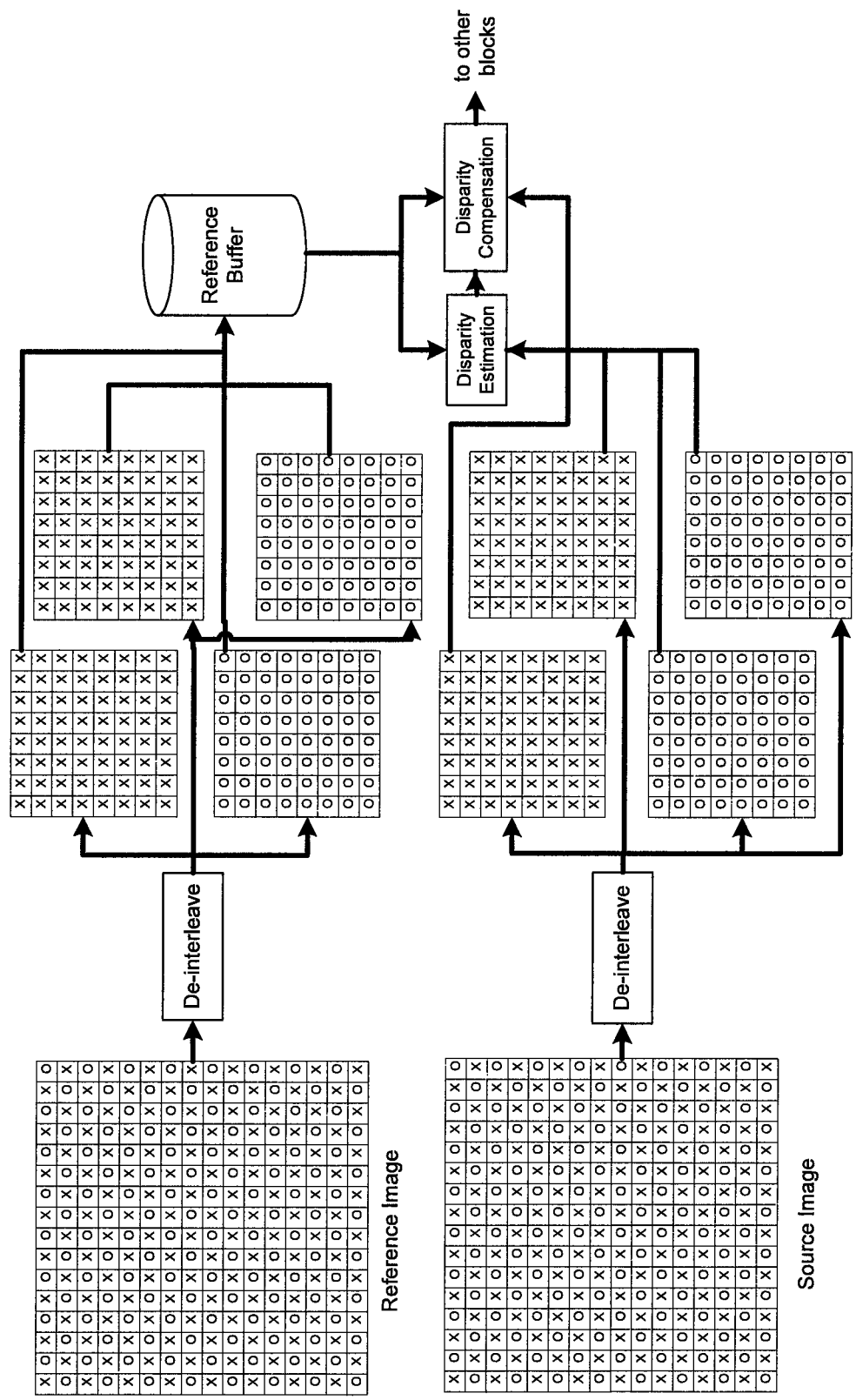
FIG. 5 is a diagram illustrating transform based de-multiplexing of CB data in a frame mode according to an embodiment of the present invention.

In an alternative embodiment, the motion estimation and compensation processes are also modified apart from the transform, in similar manner to account for the characteristics of the content. More specifically both the reference and source data are rearranged into multiple sets, each set separating the data according to view and parity. This would basically result into four (4) different arrangements (e.g., even/top or odd/bottom left and right views). This can be seen in FIG. 5, which includes an illustration of an embodiment of a reference image de-interleave result, comprising, clockwise, starting at the top left box, a set of "x's" from even rows of the left view picture (or CBLT (left top)), a set of "x's" from odd rows of the left view (or CBLB (left bottom)), a set of "o's" from even rows of the right view picture (or CBRT (right top)), and a set of "o's" from odd rows of the right view picture (or CBRB (right bottom)). A de-interleave in a matching format is also illustrated for a source image.

Each arrangement from the source can be matched with any of the arrangements of the reference data for prediction, which can include both intra and inter prediction. After the source data are predicted the residual data are also transformed, quantized, and coded in the same arrangement. This process can be seen as being rather similar to how interlace encoding is performed where the data are arranged into odd and even field/line data. However, in the present invention, data are further arranged into odd and even column as well. Similar to our transform method (which may be used alone or in combination with other techniques), this method can be signaled for use at the sequence, picture, slice, macroblock, or block level.

The picture level method, for example, can be seen as performing the encoding of 4 different pictures, CBLT, CBLB, CBRT, and CBRB. These four pictures can reference any previously encoded picture that is available in the buffer. Default reference list ordering, for obvious reasons is biased according to the topology of these pictures, i.e., a CBLT picture would give higher priority to previous CBLT pictures, a CBLB picture will give higher priority to previous CBLB pictures etc. Each such picture can be encoded with existing coding tools, i.e. AVC. When all pictures are decoded, they are then recombined in the frame buffer for further processing as a checkerboard image. If disabled, existing, e.g. progressive or interlace, coding methods are utilized such as the one already available in MPEG-4 AVC or VC1. It should be noted that the various methods of signaling enable combinations of legacy methods with our approach at the picture, slice, macroblock, or/and block level similar to what already exists in MPEG-4 AVC for interlace coding.

Figure 6:
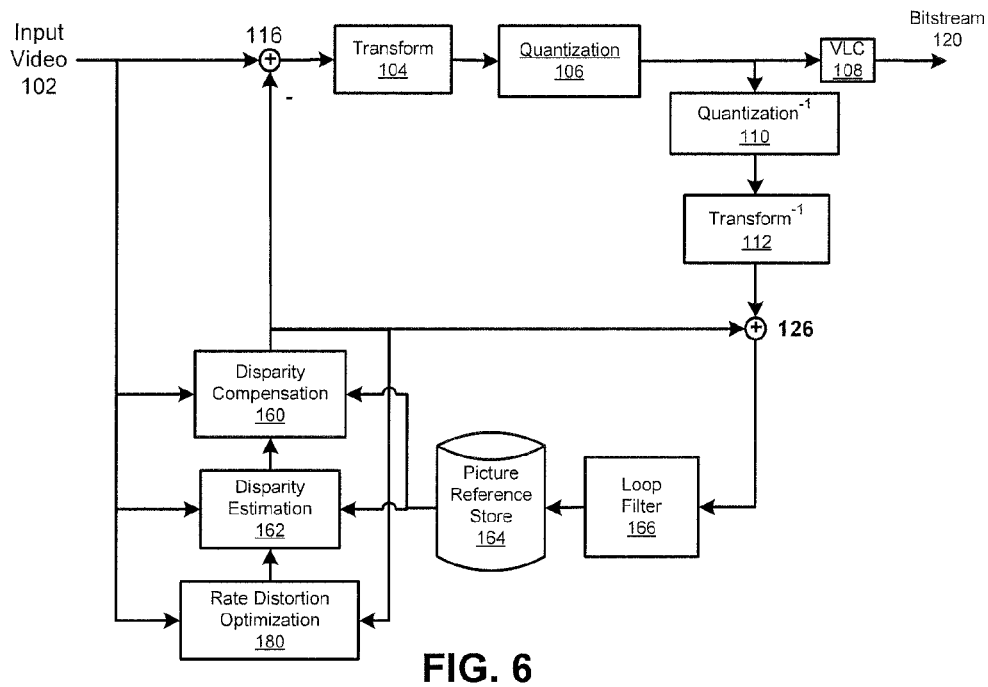
FIG. 6 is a drawing of a video encoder according to an embodiment of the present invention.
Figure 7:
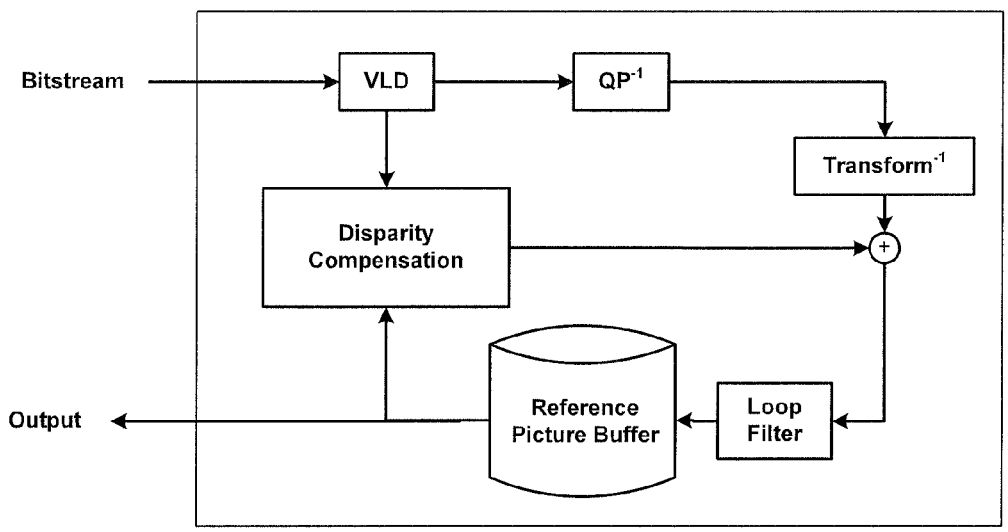
FIG. 7 is a drawing of a video de-encoder according to an embodiment of the present invention.

In a further embodiment, de-blocking of pixel data, using such a method is applied only across pixels of the same set. An encoder and decoder employing such methods can be seen in FIG. 6 and FIG. 7 respectively.

Figure 8:
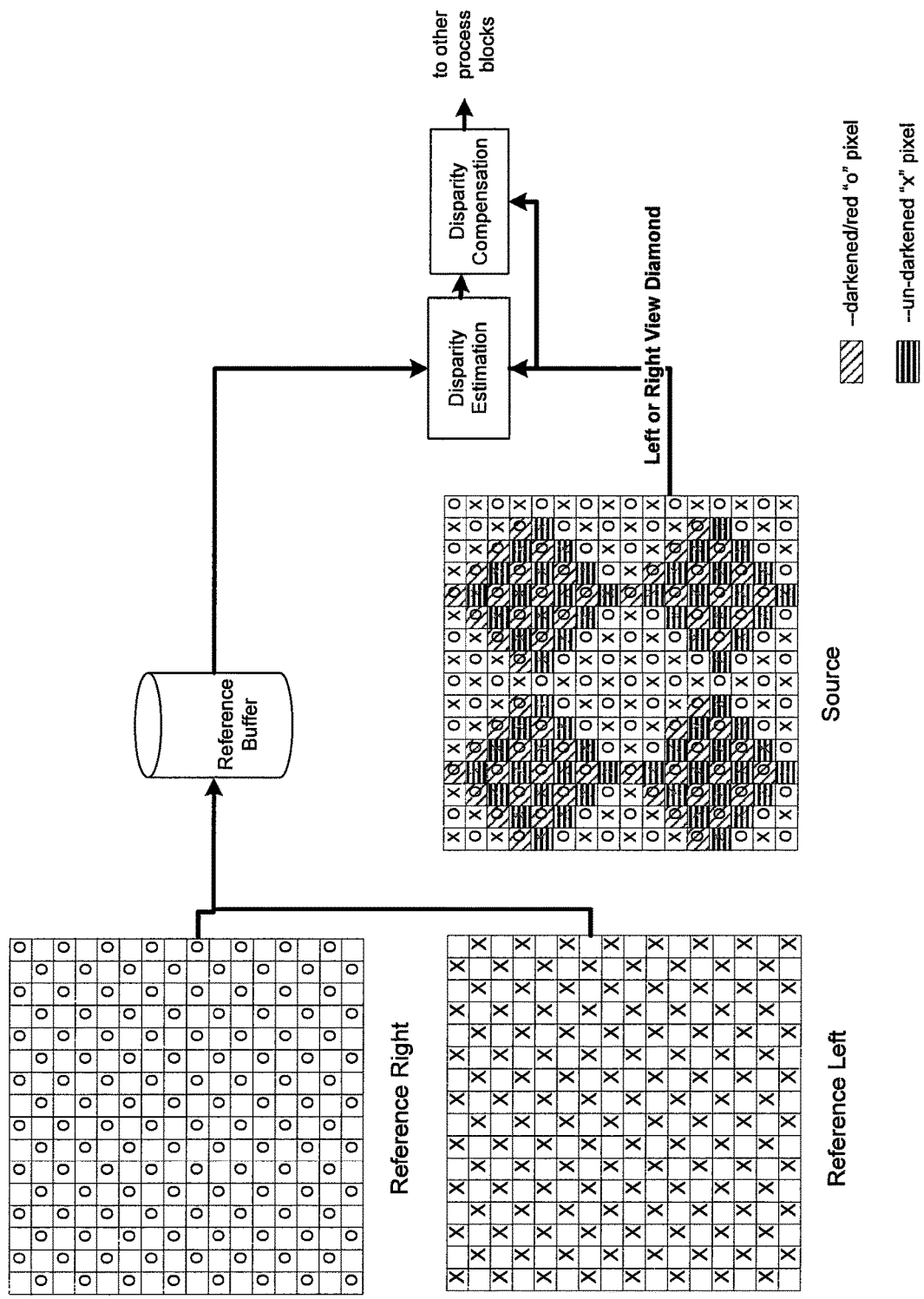
FIG. 8 is a diagram illustrating utilization of square blocks that may be extended to diamond or other blocks depending on the nature of content being encoded according to an embodiment of the present invention.

In an additional embodiment, given the characteristics of the content, instead of utilizing square or orthogonal blocks for prediction, transform and quantization, we can instead consider diamond blocks (see FIG. 8, where darkened/red "o" pixel components (diamond shaped) of an exemplary right view picture, and un-darkened "x" pixel components directly below each darkened/red "o" pixel component (also diamond shaped) of an exemplary left view picture are shown). That is, motion estimation and compensation are now employed with diamond shaped blocks of size N×M, while the transform of the residual data can be performed by using square or orthogonal transforms by first rotating the residual by an appropriate angle (e.g. 45 degrees). De-blocking is performed in this scenario on the edges of the diamond block data. Furthermore, image boundaries are processed by appropriately padding the data. The method can again be enabled at the sequence, picture, slice, macroblock or block level and can be combined with any of the previous described methods. However, it is preferred, primarily due to complexity and performance reasons, that this method is considered mainly at the sequence or picture level.

In yet another embodiment, any of the above methods could be utilized for the encoding of not only checkerboard interleaved images but also of residual data from checkerboard interleaved images, or a combination of four images that are interleaved using a periodic square tiling method.

This invention can be configured as an extension of video coding systems such as those based on MPEG-4 AVC.

Obviously, numerous modifications and variations of the present invention are possible in light of the above teachings. It is therefore to be understood that within the scope of claims to be included in a subsequently filed utility patent application, the invention may be practiced otherwise than as specifically described herein.

Figure 9:
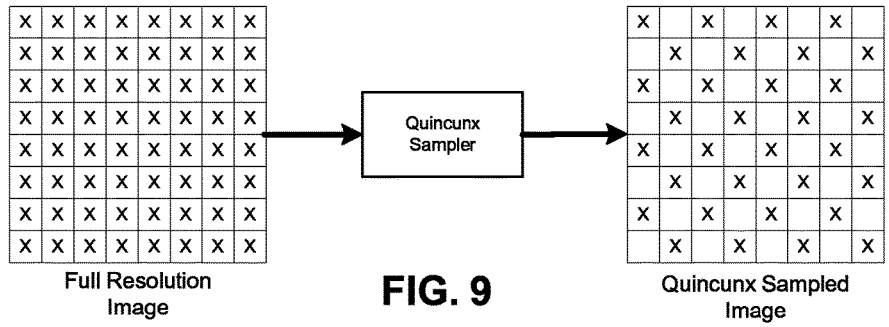
FIG. 9 is a diagram of a quincunx sampled image according to an embodiment of the present invention.

Referring again to the drawings, wherein like reference numerals designate identical or corresponding parts, and more particularly to FIG. 9 thereof, there is illustrated a sampling method for images and data referred to as the quincunx sampling. In quincunx sampling, data is sampled in a quincunx arrangement as is shown in FIG. 9. The benefit of this method, unlike horizontal and/or vertical sampling is that only ~30% of the information is lost during the sampling process, which enables higher quality during the reconstruction of the signal. The method may be used, for example, to produce samples to be multiplexed into the CB interleaved picture of FIG. 1. In that case, quincunx sampling is used in part to compress 3D images, for example. More specifically, both views of a 3D image may first be quincunx sampled and then interleaved using a checkerboard arrangement prior to compression using a codec (e.g. existing codecs such as MPEG-2, MPEG-4 AVC, and VC-1 among others).

Although we have shown that it is possible to compress quincunx sampled data, unfortunately existing compression algorithms are not well designed and to some extent are suboptimal to handle their characteristics. The resent invention includes different methods to encode such content, which would allow the existing infrastructure to be exploited while achieving improved coding efficiency and performance. This is done by performing various rearrangements of the quincunx sampled data that better fit the content characteristics [and encoding mechanisms].

In particular, we observe that quincunx samples can be separated in odd and even column (or row) data. Odd column data, if seen on their own, have similar characteristics as a normal image even though their frequency characteristics may be somewhat different. The same could also be said for even column data. We can therefore separate a quincunx sampled image into two sub-images, an odd column sub-image and an even column sub-image. These sub-images contain all information associated with the data such as luma and chroma information, transparency and depth information etc. Obviously, for scalable image systems each sub-image would also contain all relevant scalability information such as SNR layers.

Figure 10A:
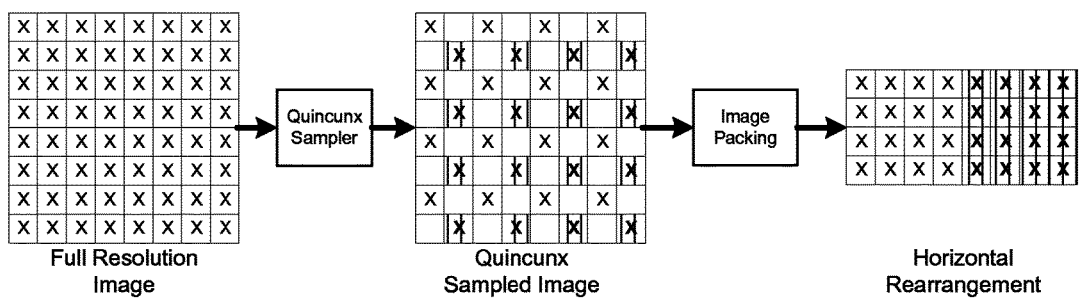
FIGS. 10A and 10B are diagrams illustrating horizontal and vertical re-arrangement (formatting) of quincunx samples to improve coding efficiency according to embodiments of the present invention.
Figure 10B:
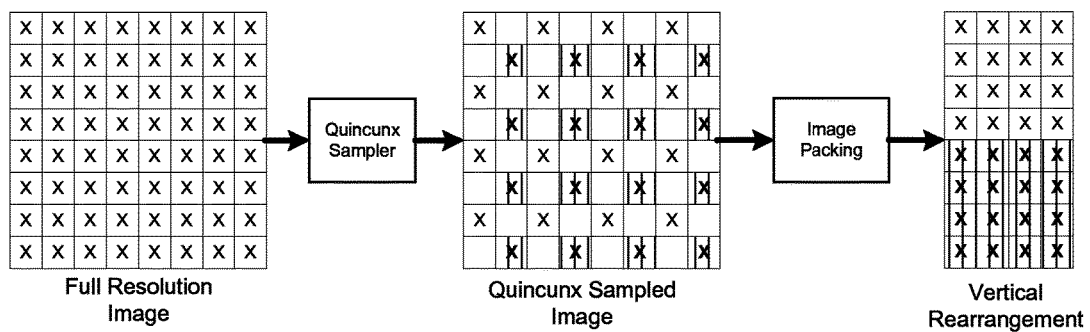
Figure 11A:
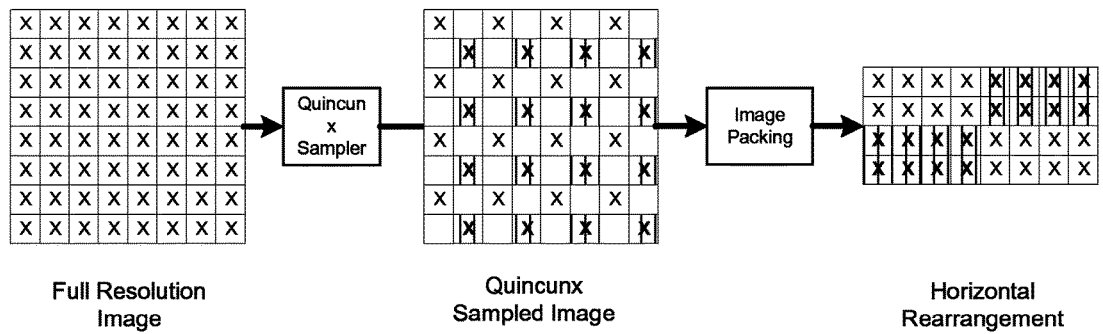
FIGS. 11A and 11B are diagrams illustrating horizontal and vertical "block" re-arrangement (formatting) of quincunx samples to improve coding efficiency according to embodiments of the present invention.
Figure 11B:
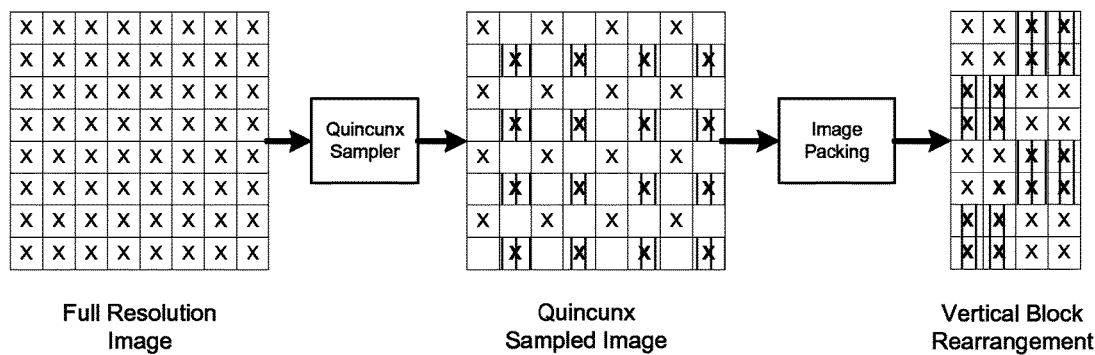

Even though we can encode each sub-image separately, it may be desirable for some environments and/or applications to instead keep the sub-images together as a single image. A possible method, for example is to package the two sub-images vertically (FIG. 10A) or vertically (FIG. 10B). Nevertheless, for some other applications it is possible to consider interleaving the two sub-images as well (FIGS. 11A and 11B). The amount of interleaving could be fixed or adaptive and could depend on a variety of requirements that our system or architecture may have. For example, if compression is of higher importance, then the interleaving could be kept to a minimal, therefore better exploiting the signal characteristics during compression (e.g. use of the discrete cosine transform/DCT and quantization, prediction etc). If, however, the reconstruction of data including memory access is of higher importance, then some interleaving between the views could be used. For example, instead of keeping the data packed using the original quincunx arrangement, the data can be packed according to their quincunx parity (odd or even) into rectangular blocks of N×M. In the two most extreme cases, {N=1, M=1} and {N=width/2, M=height/2} where width and height are the width and height of the original non sampled image. These rectangular blocks can be arranged in a variety of ways such as blocks of 4×2 size arranged horizontally (FIG. 11A), or blocks of 2×2 size arranged vertically (FIG. 11B). In a special example, given that most existing video and image codecs use blocks of size 16×16 for prediction, such a block size, or sizes larger than this size (e.g. 32×32, 32×48, 48×48 etc), could also be used. Note that in such arrangements it may be desirable to keep one of the resolution dimensions the same as that of the original non-sampled image, even though that requirement is not necessary.

As we have discussed earlier, a special case of quincunx sampled data is used for 3D applications. In this scenario, two stereo images are first quincunx sampled and then interleaved together to generate a single stereo image. Instead of only interleaving these images using a pixel level checkerboard arrangement (e.g., as in FIG. 1), interleaving methods may be employed as discussed earlier to better separate the two images, therefore better exploiting existing tools for compression. More specifically, we can now separate the left and right views into left-odd (Lo), left-even (Le), right-odd (Ro), and right-even (Re) data (Lo|Le|Ro|Re).

Figure 12:
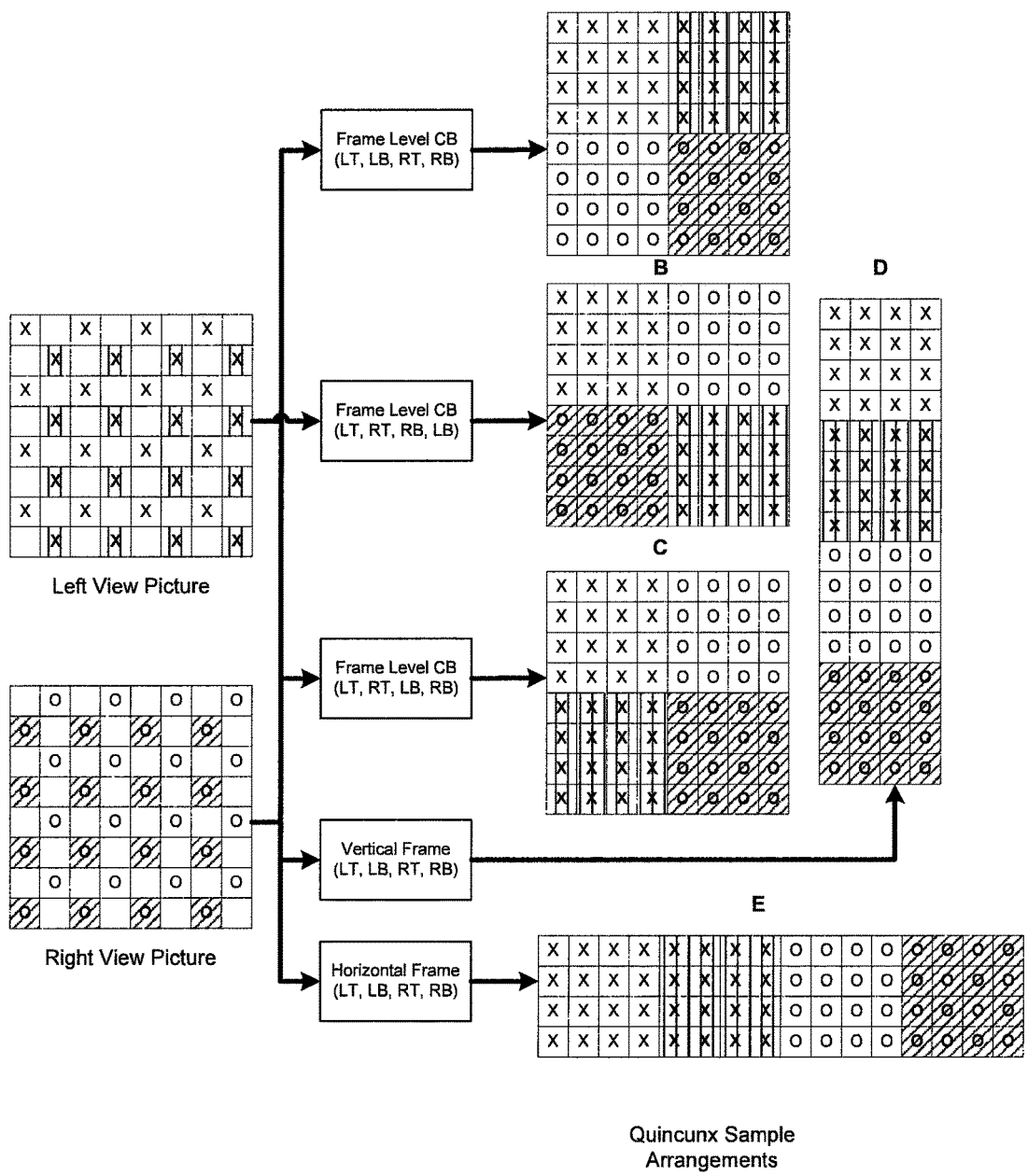
FIG. 12 is a diagram illustrating a variety of arrangements that may be utilized with quincunx sampled data (or extended to other sampling techniques) according to an embodiment of the present invention.

In one embodiment, each set of data represents a different sub-image. In the case of Lo|Le|Ro|Re, these four sub-images can be tiled together in a variety of arrangements, as shown, for example, in FIG. 12 (other arrangements and different sizes of the images arranged may also be utilized). The tiled images then represent a new image that can now be encoded using existing or newly developed encoding algorithms. For example, we can arrange the four sub-images in the Lo|Le|Ro|Re frame arrangement as shown in FIG. 12, or the checkerboard like frame level arrangement B (Lo|Ro|Re|Le). The sub-images could also be arranged all in a horizontal or vertical sub-image arrangement (arrangements D and E). Other arrangements are also possible. The arrangement type can depend on the application and its requirements. For example, arrangement A provides the benefit that one can immediately reconstruct all samples for one view independently from the other, especially if reconstruction to full resolution is required, while the method B may provide benefits in reorganizing the quincunx data into other arrangements.

Figure 13:
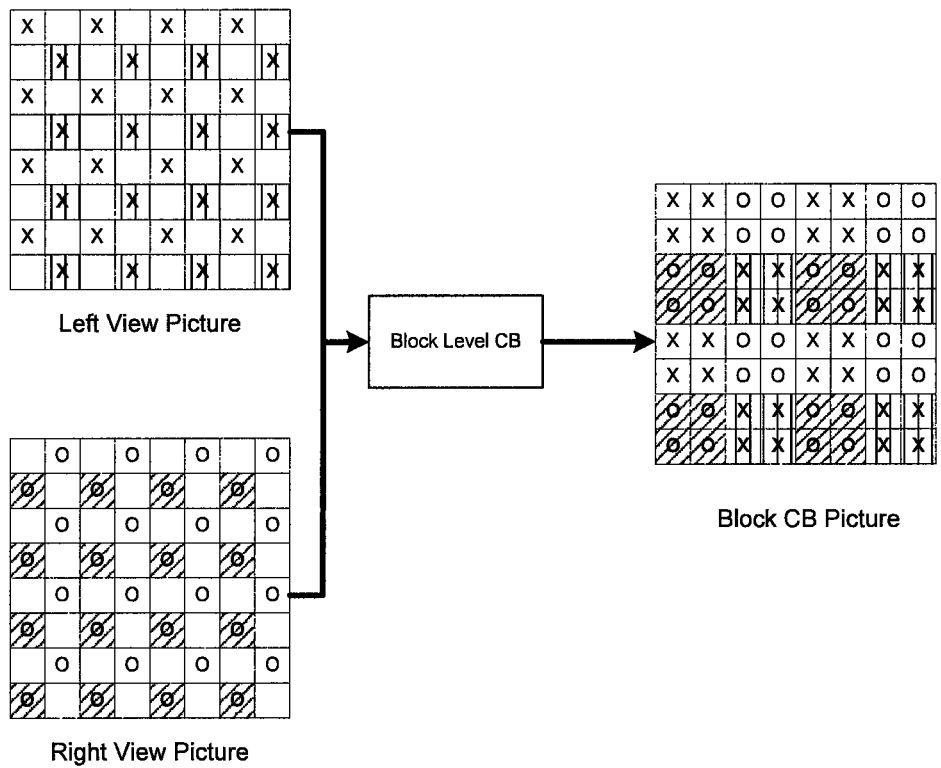
FIG. 13 is a diagram illustrating a CB arrangement that interleaves blocks of sampled data according to an embodiment of the present invention.
Figure 14:
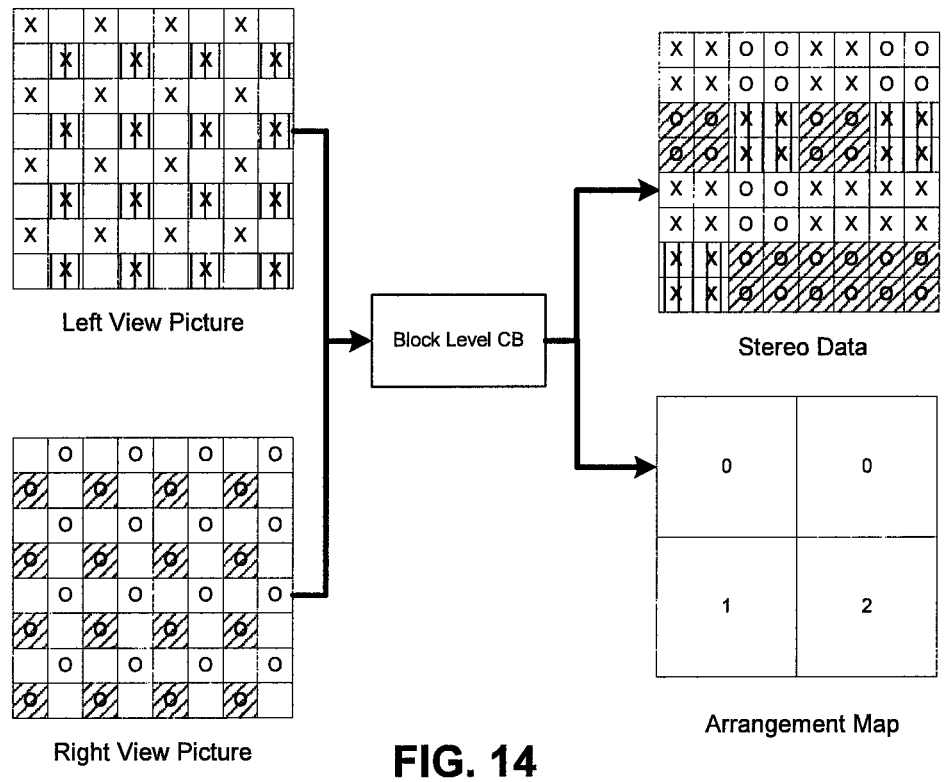
FIG. 14 is a diagram illustrating an arrangement and a map that either dictates or identifies an arrangement in each sub-region of interleaved samples according to an embodiment of the present invention.

In a different embodiment, interleaving could again consider instead of single samples or the entire sub-image, groups of samples, which essentially comprise a rectangular or even arbitrary block/region. Blocks for example could again be of fixed size M×N (FIG. 13), as was also discussed earlier, or an image could be comprised by blocks of varying shapes and/or sizes. Such an arrangement could be signaled, through, for example, a metadata method such as a map. The map could be fixed for the entire video sequence, or could be adaptive and signaled whenever necessary. As an example, in FIG. 14, a map with is provided that provides information of how sub-blocks of size 4×4 are organized in terms of interleaving. The same correspondence could apply to all samples associated with a pixel, e.g. luma and chroma information, transparency, depth/occlusion information etc, but different arrangements could also be used, including the presence of multiple/separate maps, for certain groups or for each different type of information. The separation could also involve different representations of an image, or different layers (e.g. SNR, bit depth, etc) of an image.

In another embodiment, any of the above methods could be utilized for the encoding of not only checkerboard interleaved images but also of residual data from checkerboard interleaved images, or a combination of any images that are interleaved using a periodic square tiling method. The method could also be easily extended in the interleaving of multiple images (beyond 2), including depth/occlusion information. Finally, the proposed interleaving methods could be used not only when encoding an image, but also for the generation of prediction images that can be utilized in a motion compensated video coding environment.

Figure 15:
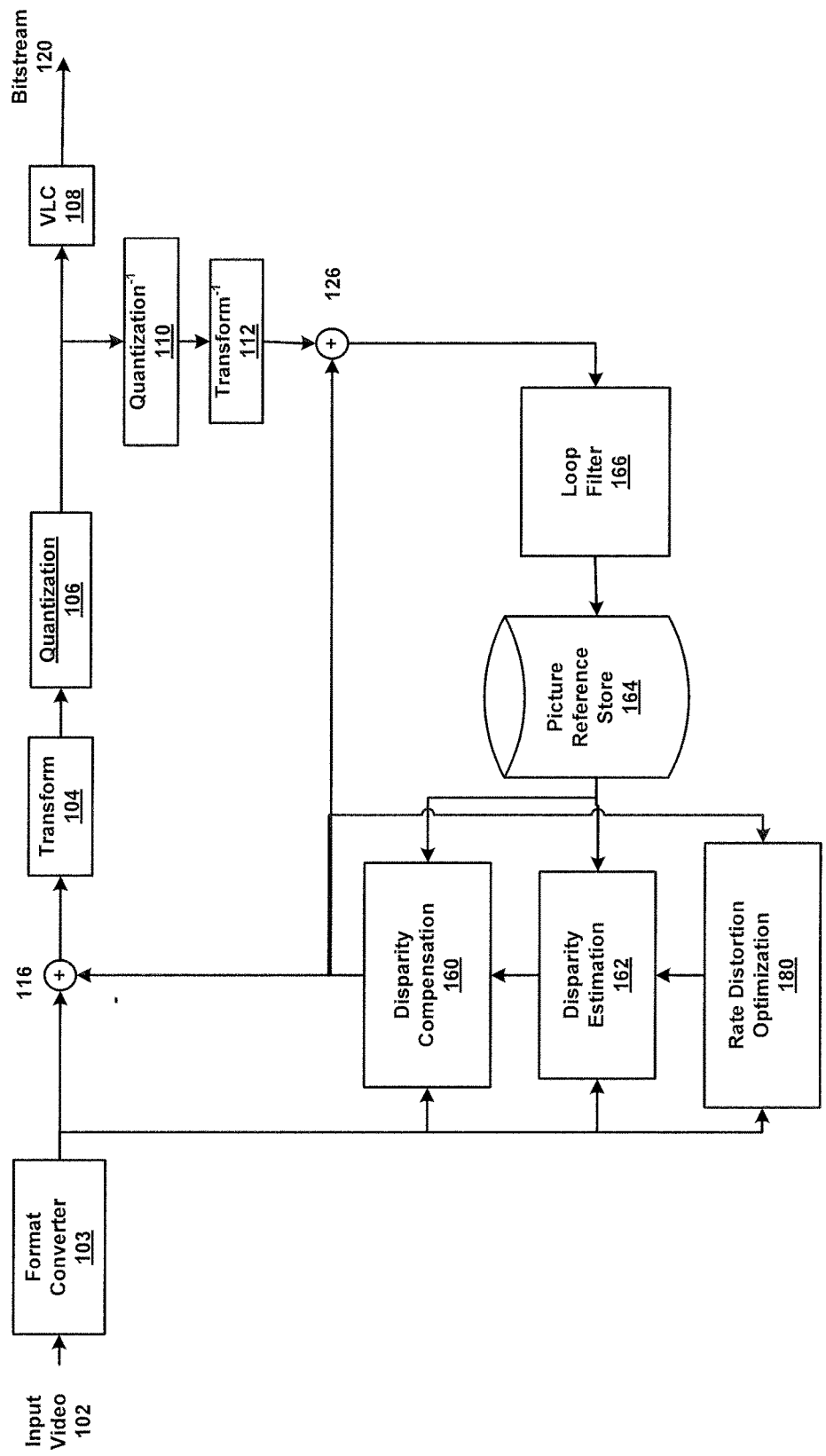
FIG. 15 is a drawing of a video encoder according to an embodiment of the present invention.
Figure 16:
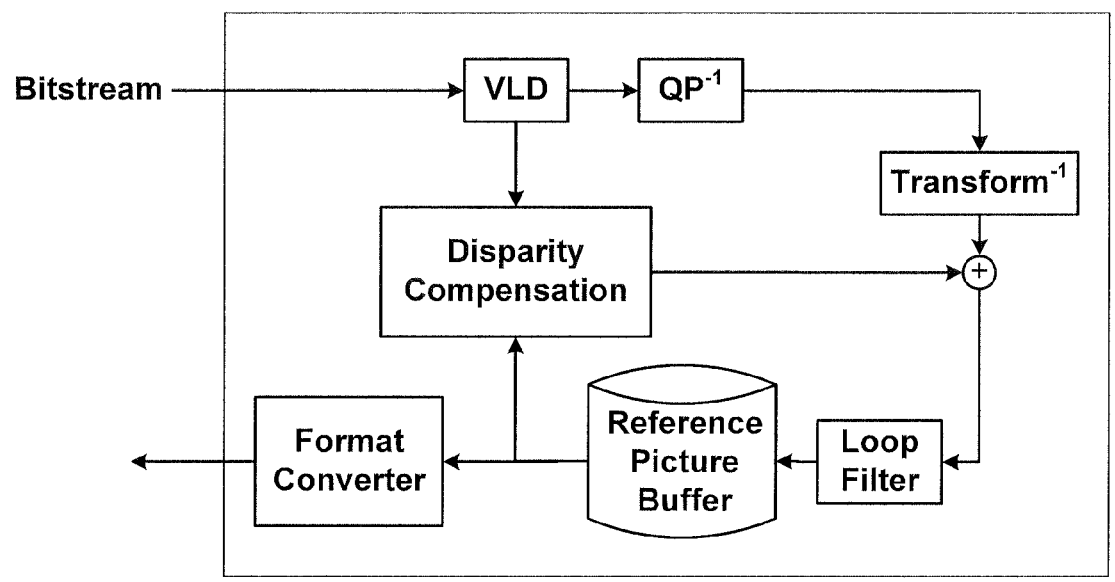
FIG. 16 is a drawing of a video decoder according to an embodiment of the present invention.

An encoder that utilizes a format converter that converts a quincunx sampled image or stereo pair into the appropriate format is presented in FIG. 15. The corresponding decoder, that decodes the image and converts this format to a different format which may be required for display or other processes is presented in FIG. 16.

Thus the present invention may take many forms. Provided hereinbelow are a set of Enumerated Example Embodiments (EEEs), which are exemplary forms of the invention that are provided as examples. As such the EEEs should not be viewed as limiting any of the above discussion or any claims also presented hereinbelow or in any follow-on continuations, re-uissues, or foreign counterpart patents and/or applications. The examples are:

EEE1. A method, comprising the steps of:
sub-sampling n images;
separating each of the sampled images into sub-images; and
packaging the sub-images together into an image frame; and
encoding the single image frame via a video encoder.

EEE2. The method according to EEE1, wherein the step of sub-sampling comprises quincunx sampling.

EEE3. The method according to EEE1, wherein the images comprise at least one of left and right views of a 3D image, multiple views of a same scene, and multiple images.

EEE3A. The method according to EEE3, wherein the images comprise one of depth and occlusion information.

EEE4. The method according to EEE1, wherein the sub-images comprise data within an image having characteristics similar to a normal image.

EEE5. The method according to EEE1, wherein the step of separating comprises separating the sampled images based on at least one of rows and columns.

EEE6. The method according to EEE1, wherein the sub-images comprise a group of more than one pixel from one of the images.

EEE7. The method according to EEE1, wherein the sub-images comprise data selected via a pattern from a corresponding image.

EEE8. The method according to EEE1, wherein the step of separating comprises preparing multiple blocks of nearby data from each of the sampled images.

EEE9. The method according to EEE1, wherein the step of packaging comprises interleaving the sub-images in a predetermined format.

EEE10. The method according to EEE9, wherein the predetermined format is changed adaptively based on at least one of the images, the sampled images, and the separated image samples.

EEE11. The method according to EEE1, further comprising the step of encoding a map identifying the predetermined format.

EEE11B. The method according to EEE11, wherein the map is encoded in an area of the image frame and the packaging of sub-images is performed in other areas of the image frame.

EEE12. The method according to Claim EEE11, wherein the map is encoded as side information.

EEE13. The method according to EEE9, wherein the interleaving comprises one of a horizontal interleaving, a vertical interleaving, and a rectangular block interleaving.

EEE14. The method according to EEE1, wherein the step of sub-sampling comprises quincunx sampling, the step of separating comprises preparing sub-images using one of every other row and every other column of a sub-sampled image, and the step of packaging comprises arranging one of row and column based sub-images.

EEE15. The method according to EEE1, further comprising the step of encoding an identifier of an arrangement of sub-images within the image frame.

EEE16. The method according to EEE1, further comprising the step of encoding an identifier of an arrangement of sub-images wherein the identifier is a code placed in side information of the encoded patterned block.

EEE17. The method according to EEE1, wherein the packaging comprises at least one of the patterns described above.

EEE18. The method according to EEE1, wherein the packaging maintains at least one dimension equivalent to a dimension of one of the sub-sampled images.

EEE19. The method according to EEE1, wherein the packaging comprises a packaging format selected for efficient use of resources to be utilized to decode the encoded image.

EEE19B. The method according to EEE1, wherein the packaging comprises a packaging format selected for enabling advanced scalability features including SNR/resolution scalability, and 2D to 3D scalability.

EEE19C. The method according to Claim 19B, wherein the packaging format is selected based on available resources, such as processing capabilities.

EEE20. The method according to EEE1, wherein the packaging comprises maintaining pixels of high value for decoding/up-sampling each [sub-image] in close proximity to each other.

EEE21. The method according to EEE1, wherein the step of encoding comprises any one image or video encoding system such as JPEG, JPEG-2000, like MPEG-2, MPEG-4 AVC, and VC1 encoding.

EEE22. A video device, comprising:
a decoder configured to decode an encoded video signal comprising more than one image per frame in the video signal;
a format converter comprising a format converter configured to de-interleave groups of video data interleaved in a frame format in the decoded video signal wherein the groups of video data comprise one or more groups of video data from a first image and one or more groups of video data from a second image.

EEE23. The video device according to EEE22, wherein the format converter comprises a de-interleaver configured to de-interleave the groups of data from multiple interleaving formats.

EEE24. The video device according to EEE22, wherein the format converter comprises a format reader configured to determine an interleaving format of the groups of data.

EEE25. The video device according to EEE22, wherein the format converter comprises a selection device configured to select one of an algorithm and specialized electronics to perform the de-interleaving based on a format of the interleaved data groups.

EEE26. The video device according to EEE22, wherein the format converter is configured to de-interleave at least one of horizontal, vertical, block-based, and map-based interleaved groups of video data.

EEE27. The video device according to EEE22, further comprising an up-converter configured to up convert the de-interleaved groups of data from at least one of the images.

EEE28. The video device according to EEE27, wherein the up-converted data is output as a 2D image.

EEE29. The video device according to EEE28, wherein the 2D image is formatted in an HDMI compatible signal.

EEE30. The video device according to EEE27, wherein the up-converted data comprises data of the first image which comprises a first view in a 3D image and data of the second image which comprises a second view of the 3D image.

EEE31. The video device according to EEE22, wherein the video device is part of at least one of a Blue-Ray DVD player, a media player, a set-top box, a cable box, a computer video card, a tuner, or other electronic device.

EEE32. The video device according to EEE22, wherein the decoder comprises one of an MPEG-2, MPEG-4 AVC, VC1, and other decoders.

EEE33. An encoding system, comprising:
a sub-sampler configured to sub-sample images of at least two different views;
a formatter configured to select at least one group of image data from each view and interleave the groups into a single image frame of a video stream; and
an encoder configured to encode the video stream.

EEE34. The encoding system according to EEE33, wherein the encoder comprises an MPEG-4 AVC encoder.

EEE35. The encoding system according to EEE33, wherein the groups of image data comprise groups of more than one pixel.

EEE36. The encoding system according to EEE33, wherein the formatter comprises an even-odd row-column selector and the interleaving groups of image data comprise groups comprising at least one of a horizontal re-arrangement, a vertical re-arrangement, an interleaved horizontal re-arrangement, an interleaved vertical re-arrangement, a block re-arrangement, an interleaved block re-arrangement, vertical interleaved re-arrangement, and a horizontal interleaved re-arrangement.

EEE37. The encoder according to EEE33, further comprising a selection device configured to select an arrangement for interleaving the groups of data.

EEE38. The encoder according to EEE33, further comprising a mapper configured to map an arrangement of data from the two images as formatted.

EEE39. A media storage having a video stream stored thereon, wherein the video stream comprises interleaved sets of data from at least two views, that, when loaded and read by a corresponding media player, cause the player to decode and then de-interleave the video stream and then format the video stream for a display device.

EEE40. The media storage according to EEE39, wherein the sets of data comprise multiple sets of data corresponding to a first view of a 3D image and multiple sets of data corresponding to a second view of the 3D image.

EEE41. The media storage according to EEE39, wherein the media storage comprises at least one of a memory card, a disk, and physical properties of an electromagnetic carrier.

EEE42. The media storage according to EEE39, wherein storage contents of the media storage as represented by physical characteristics of at least one of a memory card, an electromagnetic carrier, and an optical disk comprise the video stream and are encrypted.

EEE43. A video encoding system, comprising:
a formatter configured to format at least one package of data corresponding to a first image, at least one package of data corresponding to a second image, at least one of a resolution and dynamic range enhancement of the first image, and at least one of a resolution and dynamic range enhancement of the second image into an image data frame of a video stream;
an encoder configured to encode the formatted first image data and enhancements, second image and enhancements into a video stream for at least one of storage and broadcast.

EEE44. The video encoding system according to EEE43, wherein the encoder constrains sub-images from performing prediction from samples that correspond to other sub-images.

EEE45. The video encoding system according to EEE43, wherein the encoder constrains sub-images packaged earlier in space from performing prediction from samples that correspond to other sub-images.

EEE46. A video decoding system, comprising:
a decoder configured to decode a data frame of a video stream, wherein the data frame comprises image data from at least two images and enhancements for at least one of the images;
a re-formatter configured to re-format the decoded image data from at least one of the images to produce a low resolution version of an original image embodied by the decoded image data.

EEE47. The video decoding system according to EEE46, wherein the re-formatter comprises a de-interleaver configured to de-interleave data corresponding to the at least one image.

EEE48. The video decoding system according to EEE46, wherein the re-formatter is further configured to discard at least one of the second image data and the enhancements for at least one of the images.

EEE49. The video decoding system according to EEE46, further comprising an enhancer configured to utilize at least some of the decoded enhancements to enhance the decoded image and produce at least one of a higher resolution and higher dynamic range image.

EEE50. The video decoding system according to EEE49, wherein the enhancements are applied to each image progressively and to an extent the video decoding system is capable of doing so in real-time.

EEE60. The video decoding system according to EEE49, wherein the enhancements are applied to each image progressively if the video decoding system is capable of doing so in real-time and an output display device is capable of displaying the enhanced images.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing an interleaving technique (e.g., block, vertical, horizontal, or others), any other equivalent interleaving, or variances of those listed, or entirely different interleaving patterns that otherwise address the same issues discussed herein may be substituted therewith. Furthermore, the inventors recognize that newly developed technologies not now known may also be substituted for one or more of the described parts of the invention and still not depart from the scope of the present invention. All other described items, including, but not limited to encoders, sampling, interleaving, decoders, maps, patterns/arrangements/formats, etc should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, sampling, identifying sub-images, arranging sub-images, encoding side information in any form related to the interleaving schemes or sub-images relating to the invention, re-formatting after decoding, and the display, storage, or communication of results according to the processes of the present invention.

The present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed:

1. An apparatus comprising a non-transitory computer-readable medium for storing data accessible by a decoder, the computer-readable medium comprising:
    a compressed bitstream stored in the computer-readable medium, the compressed bitstream representing:
        pixel values of packed video frames, wherein each packed video frame comprises an interleaved arrangement of (i) samples of odd rows and odd columns of a first image, (ii) samples of even rows and even columns of the first image, (iii) samples of odd rows and even columns of a second image, and (iv) samples of even rows and odd columns of the second image, each forming a different portion of the packed video frame, respectively;
        first side information indicating a sampling format of the interleaved arrangement wherein the first side information for a particular packed video frame indicates a quincunx sampling format; and
        second side information indicating an arrangement of the pixel values of the first and second images in the interleaved arrangement, wherein the second side information for the particular packed video frame indicates a vertical arrangement,
        wherein the particular packed video frame comprises (i) samples of the first image arranged as a top portion of the packed video frame, and (ii) samples of the second image arranged as a bottom portion of the packed video frame.

2. An apparatus comprising a non-transitory computer-readable medium for storing data accessible by a decoder, the computer-readable medium comprising:
    a compressed bitstream stored in the computer-readable medium, the compressed bitstream representing:
        pixel values of packed video frames, wherein each packed video frame comprises an interleaved arrangement of (i) samples of odd rows and odd columns of a first image, (ii) samples of even rows and even columns of the first image, (iii) samples of odd rows and even columns of a second image, and (iv) samples of even rows and odd columns of the second image, each forming a different portion of the packed video frame, respectively;
        first side information indicating a sampling format of the interleaved arrangement, wherein the first side information for a particular packed video frame indicates a quincunx sampling format,
        second side information indicating an arrangement of the pixel values of the first and second images in the interleaved arrangement, wherein the second side information for the particular packed video frame indicates a vertical arrangement, and
        wherein the particular packed video frame comprises (i) samples of odd rows and odd columns of the first image arranged as a top-left portion of the packed video frame, (ii) samples of even rows and even columns of the first image arranged as a top-right portion of the packed video frame, (iii) samples of odd rows and even columns of the second image arranged as a bottom-left portion of the packed video frame, and (iv) samples of even rows and odd columns of the second image arranged as a bottom-right portion of the packed video frame.

3. An apparatus comprising a non-transitory computer-readable medium for storing data accessible by a decoder, the computer-readable medium comprising:
    a compressed bitstream stored in the computer-readable medium, the compressed bitstream representing:
        pixel values of packed video frames, wherein each packed video frame comprises an interleaved arrangement of (i) samples of odd rows and odd columns of a first image, (ii) samples of even rows and even columns of the first image, (iii) samples of odd rows and even columns of a second image, and (iv) samples of even rows and odd columns of the second image, each forming a different portion of the packed video frame, respectively;
        first side information indicating a sampling format of the interleaved arrangement, wherein the first side information for a particular packed video frame indicates a quincunx sampling format,
        second side information indicating an arrangement of the pixel values of the first and second images in the interleaved arrangement, wherein the second side information for the particular packed video frame indicates a vertical arrangement, and
        wherein the particular packed video frame comprises (i) samples of odd rows and odd columns of the first image arranged as a top-left portion of the packed video frame, (ii) samples of even rows and even columns of the first image arranged as a bottom-right portion of the packed video frame, (iii) samples of odd rows and even columns of the second image arranged as a top-right portion of the packed video frame, and (iv) samples of even rows and odd columns of the second image arranged as a bottom-left portion of the packed video frame.

4. The apparatus of claim 1, wherein the compressed bitstream comprises a stereoscopic (3D) video signal with a left view and a right view.

5. The apparatus of claim 1, wherein the first side information or the second side information is changed adaptively in the compressed bitstream.

6. The apparatus of claim 1, wherein the first side information or the second side information is changed adaptively at one or more of a sequence, picture, and slice level.

7. An apparatus to encode a sequence of multi-view frames into a compressed bitstream, the apparatus comprising:
    an input port to receive a first view image and a second view image;
    one or more processors configured to:
        sample odd rows and odd columns of the first view image to generate a first sub-image of a packed video frame;
        sample even rows and even columns of the first view image to generate a second sub-image of the packed video frame;
        sample odd rows and even columns of the second view image to generate a third sub-image of the packed video frame;
        sample even rows and odd columns of the second view image to generate a fourth sub-image of the packed video frame;

generate first side information for the packed video frame indicating a quincunx sampling format for the interleaved first and second view images;

generate second side information for the packed video frame indicating how the first, second, third, and fourth sub-images are tiled together to form the packed video frame, wherein the second side information indicates that (i) the first sub-image forms a top-left portion of the packed video frame, (ii) the second sub-image forms a bottom-left portion of the packed video frame, (iii) the third sub-image forms a top-right portion of the packed video frame, and (iv) the fourth sub-image forms a bottom-right portion of the packed video frame; and an output port to output the packed video frame, the first side information, and the second side information.

8. An apparatus to encode a sequence of multi-view frames into a compressed bitstream, the apparatus comprising:
an input port to receive a first view image and a second view image;
one or more processors configured to:
sample odd rows and odd columns of the first view image to generate a first sub-image of a packed video frame;
sample even rows and even columns of the first view image to generate a second sub-image of the packed video frame;
sample odd rows and even columns of the second view image to generate a third sub-image of the packed video frame;
sample even rows and odd columns of the second view image to generate a fourth sub-image of the packed video frame;
generate first side information for the packed video frame indicating a quincunx sampling format for the interleaved first and second view images;
generate second side information for the packed video frame indicating how the first, second, third, and fourth sub-images are tiled together to form the packed video frame, wherein the second side information indicates that (i) the first sub-image forms a top-left portion of the packed video frame, (ii) the second sub-image forms a top-right portion of the packed video frame, (iii) the third sub-image forms a bottom-left portion of the packed video frame, and (iv) the fourth sub-image forms a bottom-right portion of the packed video frame.

9. An apparatus to encode a sequence of multi-view frames into a compressed bitstream, the apparatus comprising:
an input port to receive a first view image and a second view image;
one or more processors configured to:
sample odd rows and odd columns of the first view image to generate a first sub-image of a packed video frame;
sample even rows and even columns of the first view image to generate a second sub-image of the packed video frame;
sample odd rows and even columns of the second view image to generate a third sub-image of the packed video frame;
sample even rows and odd columns of the second view image to generate a fourth sub-image of the packed video frame;
generate first side information for the packed video frame indicating a quincunx sampling format for the interleaved first and second view images;
generate second side information for the packed video frame indicating how the first, second, third, and fourth sub-images are tiled together to form the packed video frame, wherein the second side information indicates a vertical arrangement, wherein (i) samples of the first view image form a top portion of the packed video frame, and (ii) samples of the second view image form a bottom portion of the packed video frame.

10. The apparatus of claim 7, wherein the first side information or the second side information is changed adaptively based on characteristics of the first view image and the second view image.

11. The apparatus of claim 7, wherein the first side information or the second side information is changed adaptively at one or more of a sequence, picture, and slice level.

12. An apparatus comprising a non-transitory computer-readable medium for storing data accessible by a decoder, the computer-readable medium comprising a compressed bitstream stored in the computer-readable medium, the compressed bitstream including:
pixel valued of packed video frames, wherein each frame comprises a first image and a second image in an interleaved arrangement;
first side information indicating a sampling format of the interleaved arrangement, wherein the first side information for a particular packed video frame indicates a quincunx sampling format; and
second side information indicating an arrangement of the pixel values of the first and second images in the interleaved arrangement, wherein the interleaved arrangement indicates tiling information for four sub-images for each packed video frame, wherein the four sub-images include (i) a first sub-image generated based on samples of odd rows and odd columns of the first image, (ii) a second sub-image generated based on samples of even rows and even columns of the first image, (iii) a third sub-image generated based on samples of odd rows and even columns of a second image, and (iv) a fourth sub-image generated based on samples of even rows and odd columns of the second image.

13. The apparatus of claim 12, wherein the second side information indicates that (i) the first sub-image forms a top-left portion of the packed video frame, (ii) the second sub-image forms a bottom-left portion of the packed video frame, (iii) the third sub-image forms a top-right portion of the packed video frame, and (iv) the fourth sub-image forms a bottom-right portion of the packed video frame.

14. The apparatus of claim 12, wherein the second side information indicates that (i) the first sub-image forms a top-left portion of the packed video frame, (ii) the second sub-image forms a top-right portion of the packed video frame, (iii) the third sub-image forms a bottom-left portion of the packed video frame, and (iv) the fourth sub-image forms a bottom-right portion of the packed video frame.

15. The apparatus of claim 12, wherein the second side information indicates that (i) the first sub-image forms a top-left portion of the packed video frame, (ii) the second sub-image forms a bottom-right portion of the packed video frame, (iii) the third sub-image forms a top-right portion of the packed video frame, and (iv) the fourth sub-image forms a bottom-left portion of the packed video frame.

16. The apparatus of claim 12, wherein the first side information or the second side information is changed adaptively based on characteristics of the first image and the second image.

17. The apparatus of claim 12, wherein the first side information or the second side information is changed adaptively at one or more of a sequence, picture, and slice level.

* * * * *